(12) United States Patent
Saldanha et al.

(10) Patent No.: US 7,663,648 B1
(45) Date of Patent: Feb. 16, 2010

(54) SYSTEM AND METHOD FOR DISPLAYING SELECTED GARMENTS ON A COMPUTER-SIMULATED MANNEQUIN

(75) Inventors: Carlos Saldanha, St-Hilaire (CA); Andrea M. Froncioni, Montreal (CA); Paul A. Kruszewski, Montreal (CA); Gregory J. Saumier-Finch, Outremont (CA); Caroline M. Trudeau, Montreal (CA); Fadi G. Bachaalani, Ville St-Laurent (CA); Nader Morcos, Montreal (CA); Sylvain B. Cote, Laurier-Station (CA); Patrick R. Guevin, Verdun (CA); Jean-Francois B. St. Arnaud, Outremont (CA); Serge Veillet, Montreal (CA); Louise L. Guay, Outremont (CA)

(73) Assignee: My Virtual Model Inc., Montreal (CA)

( * ) Notice: Subject to any disclaimer, the term of this patent is extended or adjusted under 35 U.S.C. 154(b) by 922 days.

(21) Appl. No.: 09/439,225

(22) Filed: Nov. 12, 1999

(51) Int. Cl.
*G06F 15/00* (2006.01)
(52) U.S. Cl. ............... 345/630; 345/419; 345/420; 345/423; 345/428; 345/435; 345/473; 345/474
(58) Field of Classification Search ............... 345/441, 345/442, 443, 467, 473–474, 706, 702, 719, 345/722, 629–630, 418–428; 66/147, 171; 223/66, 85, 92; 33/17 A, 17 R; 700/132; 382/111
See application file for complete search history.

(56) References Cited

U.S. PATENT DOCUMENTS

| | | | | |
|---|---|---|---|---|
| 4,149,246 A | 4/1979 | Goldman | ............... | 364/200 |
| 4,261,012 A | 4/1981 | Maloomian | ............... | 358/93 |
| 4,539,585 A | 9/1985 | Spackova et al. | ............... | 358/93 |
| 4,546,434 A | 10/1985 | Gioello | ............... | 364/300 |
| 4,598,376 A | 7/1986 | Burton et al. | ............... | 364/470 |
| 4,885,844 A | 12/1989 | Chun | ............... | 33/15 |
| 4,899,448 A | 2/1990 | Huang | ............... | 33/17 R |
| 4,916,624 A | 4/1990 | Collins et al. | ............... | 364/470 |

(Continued)

FOREIGN PATENT DOCUMENTS

CA 1237528 5/1988

(Continued)

OTHER PUBLICATIONS

Volino, P., et al., "An Evolving System for Simulating Clothes on Virtual Actors", Computer Graphics in Textiles and Apparel, 42-51, (Sep. 1996).*

(Continued)

*Primary Examiner*—Jin-Cheng Wang
(74) *Attorney, Agent, or Firm*—Schwegman Lundberg & Woessner, P.A.

(57) ABSTRACT

A method and system for providing a computer-simulated environment for displaying a selected mannequin wearing a combination of selected garments. In one aspect, three-dimensional scenes containing mannequin and garment objects are created within a three-dimensional modeling environment, and a simulation is performed using a cloth simulator within the modeling environment to model the construction, draping, and collision of the garment with the mannequin. Rendering frames corresponding to a variety of garments, mannequins, garment dimensions, garment styles, wearing patterns, viewing angles, and other parameters, are then generated from which images can be rendered and displayed in accordance with user requests.

42 Claims, 13 Drawing Sheets

U.S. PATENT DOCUMENTS

| | | | |
|---|---|---|---|
| 4,916,634 A | 4/1990 | Collins et al. ............... | 364/513 |
| 4,926,344 A | 5/1990 | Collins et al. ............... | 364/513 |
| 4,949,286 A | 8/1990 | Ohba .......................... | 364/521 |
| 4,984,155 A | 1/1991 | Geier et al. ................. | 364/401 |
| 4,984,721 A * | 1/1991 | Eiley et al. .................... | 223/96 |
| 5,060,171 A | 10/1991 | Steir et al. ................. | 364/521 |
| 5,163,006 A | 11/1992 | Deziel ....................... | 364/470 |
| 5,163,007 A | 11/1992 | Slilaty ....................... | 364/470 |
| 5,247,610 A | 9/1993 | Oshima et al. ............. | 395/135 |
| 5,341,305 A | 8/1994 | Clarino et al. ............. | 364/470 |
| 5,363,476 A | 11/1994 | Kurashige et al. .......... | 395/125 |
| 5,383,111 A | 1/1995 | Homma et al. ............. | 364/401 |
| 5,495,568 A * | 2/1996 | Beavin ........................ | 700/83 |
| 5,504,845 A * | 4/1996 | Vecchione .................. | 345/419 |
| 5,515,268 A | 5/1996 | Yoda .......................... | 364/401 |
| 5,551,021 A | 8/1996 | Harada et al. .............. | 395/600 |
| 5,557,527 A * | 9/1996 | Kotaki et al. ............... | 700/131 |
| 5,559,709 A | 9/1996 | Ohno et al. ............ | 364/468.01 |
| 5,566,867 A | 10/1996 | Goray ......................... | 223/66 |
| 5,615,318 A | 3/1997 | Matsuura ................... | 395/120 |
| 5,680,314 A | 10/1997 | Patterson et al. ....... | 364/470.03 |
| 5,680,528 A * | 10/1997 | Korszun ..................... | 345/630 |
| 5,715,314 A | 2/1998 | Payne et al. ................... | 380/24 |
| 5,724,522 A | 3/1998 | Kagami et al. ............. | 395/226 |
| 5,774,870 A | 6/1998 | Storey ......................... | 705/14 |
| 5,850,222 A * | 12/1998 | Cone .......................... | 345/418 |
| 5,897,620 A | 4/1999 | Walker et al. ................. | 705/5 |
| 5,909,492 A | 6/1999 | Payne et al. ................... | 380/24 |
| 5,930,769 A | 7/1999 | Rose ........................... | 705/27 |
| 5,937,081 A | 8/1999 | O'Brill et al. ............... | 382/111 |
| 5,987,929 A * | 11/1999 | Bostani ....................... | 66/1 R |
| 6,088,017 A * | 7/2000 | Tremblay et al. .......... | 345/156 |
| 6,113,395 A * | 9/2000 | Hon ........................... | 434/262 |
| 6,307,568 B1 * | 10/2001 | Rom .......................... | 345/629 |
| 6,310,627 B1 * | 10/2001 | Sakaguchi ................. | 345/630 |
| 6,404,426 B1 * | 6/2002 | Weaver ....................... | 345/419 |
| 6,462,740 B1 * | 10/2002 | Immel ........................ | 345/473 |
| 2002/0021297 A1 | 2/2002 | Weaver ....................... | 345/420 |

FOREIGN PATENT DOCUMENTS

| | | | |
|---|---|---|---|
| CA | 2130707 | | 3/1995 |
| CA | 2259788 | * | 3/1995 |
| CA | 2259788 | | 7/1999 |
| CA | 2162599 | | 5/2000 |
| CA | 2376772 | | 12/2000 |
| DE | 19635753 | | 4/1998 |
| WO | 0077744 | | 6/1999 |

OTHER PUBLICATIONS

Pascal Volino, Nadia Magnenat Thalmann, Shen Jianhua, D. Thalmann, "The Evolution of a 3D System for Simulating Deformable Clothes on Virtual Actors", MIRALab 1998, pp. 1-21.*

Black, S.S., "[TC]2 Moves Forward with Body Scanning, Other Research", *Bobbin*, 37 (9), L.C. Rabon, Senior Ed.:Columbia, SC, pp. 26-28, (May 1996).

DesMarteau, K., "Custom Manufacturers Suit Up with Technology", *Bobbin*, 36 (8), 4 p., (Apr. 1, 1995).

Rabon, L.C., "Custon Fit Comes of Age", *Bobbin Magazine*, 37 (12), 5 p., (Aug. 1996).

*JCPenney Private Plan for Susan Smith*, Copyright by Accolade, Inc., 14 p., (1990).

*Magazine articles regarding Vestimetra*, 15 p., (1989-1990).

*Private Plan Personal Profile for 3*, by Always In Style, (69 p.).

"Always in Style", *Personal Profile Processing System Operation Manual, Revision 1*, Yuri Dobruskin Associates, New York City, NY, 38 p., (Aug. 1994).

"Learn From The Player Who Has Won More Matches Than Anyone In Pro Tennis: Chris Evert", *SyberVision*, Pleasanton, California, 36 p., (1991).

"Personal Touch—A Sales Training and Customer Service Program Exclusively for JCPenney", *Program Implementation Procedures (A-Z)*, Always In Style, 11 p., (1991).

"The Retail Connection", *JCPenney Sales Associates Training Manual*, Always In Style, 24 p., (1992).

Agins, T., "Go Figure: Same Shopper Wears Size 6, 8, 10, 12", *The Wall Street journal*, 1 p., (Nov. 11, 1994).

Ashdown, S.P., et al., "Perception Testing of Apparel Ease Variation", *Applied Ergonomics*, 26 (1)—Abstract, http://www.ergoweb.com/Pub/Info/Ref/AppErgo/Abstract/a9547.htm, 1 p., (1995).

Byers, M., et al., *Designing Women, The Art, Technique, And Cost of Being Beautiful*, Simon and Schuster, New York, pp. 11-49, (1938).

Duffy, M., *The Hoax Fashion Formula*, The Body Press, Tucson, AZ, pp. 1-247, (1987).

Fenner, A., et al., *Dress Smart—A Guide to Effective Personal Packaging*, Fairchild Publications, New York, pp. 1-199, (1988).

Gilbert, L., "CAD Comes Of Age", *Bobbin Magazine: Special Report: Information Technology*, pp. 48-52, (Jul. 1995).

Gray, S., *CAD in Clothing and Textiles, A Collection of Expert Views, Second Edition*, Winifred Aldrich, Ed., Blackwell Science, 44 p., (1994).

Harris, M.S., et al., "Made-To-Measure: Computing A Great Fit", *Bobbin Magazine*, pp. 57-61, (Mar. 1992).

Hauser, N., "Sizing Up Clothing Sizes", *KnowHow*, pp. 52-54, (1994).

Hinds, B.K., et al., "3D CAD for Garment Design", *International Journal of Clothing Science and Technology*, 4 (4), pp. 6-14, (1992).

Koh, T., et al., "Communications—An Analysis of the Apparel Pattern-Making Process", *International Journal of Clothing Science and Technology*, 7 (4), pp. 54-64, (1995).

Lipkin, R., "Fit for a King—Computer scanners capture the body's subtle shapes",*Science News Online*, http://www.sciencenews.org/sn_arch/5_18_96/bpb1.htm, pp. 1-5, (1996).

Milo, M., "The Look of Total Beauty", *Family Circle Guide to Beauty, Your Hair, Your Face, Your Figure*, Revised Edition, pp. 104-109, (1972).

Minnick, W., et al., *Always in Style Portfolio and related documents*, Accolade, Inc., 93 p., (Jun. 1990).

Mixon, Jr., B., "New Body Scanner Promises Better Fits", *Air Force News*, http://www.af.mil/news/Jan1996/n19960130_960111.htm, 2 p., (1996).

Morris, S.W., "Create the Impression You Want to Make in Your Professional, Social, and Private Life!", *Wardrobe Strategy*, Morris Publishing Company, San Francisco, CA, 31 p., (May 1986).

Nix-Rice, N., *Looking Good—A Comprehensive Guide to Wardrobe Planning, Color & Personal Style Development*, Palmer/Pletsch Publications, pp. 1-161, (1996).

Pooser, D., et al., *Always In Style with Color Me Beautiful*, Acropolis Books Ltd., 104 p., (1985).

Pooser, D., et al., *JCPenney Secrets of Style! Wardrobe Guide & Fashion Forecast*, 35 p., (1992).

Quittner, J., "All-in-One Gizmo? Handspring's new personal digi-assistant may be the last gadget you'll ever need. If it works.", *Time*, 1 p., (Sep. 27, 1999).

Rasband, J., *Wardrobe Strategies For Women*, Delmar Publishers, pp. 88-91, (1996).

Ryan, M.G., *Dress Smartly, A 100 Point Guide*, Charles Schribner's Sons, New York, 19 p., (1956).

Ryan, M.G., et al., *Clothes For You, Second Edition*, Appleton-Century-Crofts, Inc., New York, pp. 110-143, (1954).

Schmier, W., et al., "Intel Unveils Highly Advanced 3-D Scanning System", *Intel Press Release*, http://www.intel.gov/whats_new/press_releases/1995/3dimagin.htm, 2 p., (1995).

Shen, L., et al., "Bodice Pattern Development Using Somatographic and Physical Data", *International Journal of Clothing Science and Technology*, 5 (1), pp. 6-16, (1993).

Smith, S., "Private Plan—Personal Profile for Susan Smith", *Always in Style*, Copyright by Accolade, Inc., 13 p., (1991).

Story, M., *Individuality and Clothes—The Blue Book of Personal Attire*, Funk & Wagnalls Company, pp. 196-213, (Apr. 1930).

Stylios, G., "Modelling the Dynamic drape of Fabrics on Synthetic humans: A Physical, Lumped-parameter Model", *International Journal of Clothing Science and Technology*, 7 (5), 30 p., (1995).

Taylor, N., *The Clothes You Wear, Book 3*, ITT Educational Services, Inc., New York, NY, pp. 19-53, (1971).

Turner, J.P., "Development of a Commercial Made-To-Measure Grment Pattern System", *International Journal of Clothing Science and Technology*, 6 (4), pp. 28-33, (1994).

Weiland, B., et al., "Straight Talk About Wardrobe Planning", *Clothes Sense*, Copyright by Palmer/Pletsch Associates, 128 p., (1984).

Whitlock, K., "New Software Makes-To-Order Uniforms, Clothing A Reality", http://www.ohiou.edu/news/months/may97/303d.htm, 2 p., (1997).

Yeh, T., "Pattern Construction Rules For Down's Syndrome Females", *International Journal of Clothing Science and Technology*, 3 (4), pp. 25-32, (1991).

Amaral, C., et al., "Marker-Making Using Automatic Placement of Irregular Shapes for the Garment Industry", *Computer & Graphics*, 14(1), 41-46, (1990).

Breen, D.E., et al., "Predicting the Drape of Woven Cloth Using Interacting Particles", *Computer Graphics Proceedings, Annual Conference Series, 1994*, SIGGRAPH 94, Orlando, Florida, Jul. 24-29, 1994, 365-372, (1994).

Cai, Z., "Covergence, Error Estimation and Some Properties of Four-Point Interpolation Subdivision Scheme", *Computer Aided Geometric Design*, 12, 459-468, (1995).

Carignan, M., et al., "Dressing Animated Synthetic Actors with Complex Deformable Clothes", *Computer Graphics*, 26, SIGGRAPH'92 Chicago, Jul. 26-31, 1992, 99-104, (Jul. 1992).

Eberhardt, B., et al., "A Fast, Flexible, Particle-System Model for Cloth Draping", *Computer Graphics in Textiles and Apparel*, 52-59, (Sep. 1996).

Hinds, B.K., et al., "Pattern Development for 3D Surfaces", *Computer Aided Design*, 23(8), 583-592, (Oct. 1991).

Kunii, T.L., et al., "Singularity Theoretical Modeling and Animation of Garment Wrinkle Formation Processes", *The Visual Computer*, 6, 326-336, (1990).

Ng, H.N., et al., "Computer Graphics Techniques for Modeling Cloth", *Computer Graphics in Textiles and Apparel*, 28-41, (Sep. 1996).

Nisselson, J., "Computer Graphics and the Fashion Industry", *Proceedings of Graphics Interface '86 and Vision Interface '86*, Conference: May 26-30, 1986, Vancouver, BC, Canada, 1-7, (1986).

Okabe, H., et al., "Three Dimensional Apparel CAD System", *Computer Graphics*, 26(2), SIGGRAPH '92, Chicago, Jul. 26-31, 1992, 105-110, (1992).

Terzopoulos, D., et al., "Deformable Models", *The Visual Computer*, 4, 306-331, (1988).

Terzopoulos, D., et al., "Elastically Deformable Models", *Computer Graphics*, 21(4), SIGGRAPH '87, Anaheim, Jul. 27-31, 1987, 205-214, (Jul. 1987).

Yang, Y., et al., "Three-Dimensional Garment Design and Animation", *Computers in Industry*, 19, 185-191, 195-196 (1992).

* cited by examiner

GARMENT MODEL (SIMULATED)

GARMENT MODEL (UNSIMULATED)

GARMENT PATTERN

3D LAYERS

2D COMPOSITING LAYERS

SYSTEM AND METHOD FOR DISPLAYING SELECTED GARMENTS ON A COMPUTER-SIMULATED MANNEQUIN

FIELD OF THE INVENTION

The present invention relates to methods and systems for producing images of computer-simulated clothing.

BACKGROUND

The concept of a computerized or simulated dressing environment is a user-operated display system that generates computer-simulated images of a human figure wearing one or more selected garments. The simulated human figure thus represents a virtual model or mannequin for modeling clothes. Such an environment should ideally provide the user with the capability of viewing the mannequin and garment from a plurality of viewpoints to give a three-dimensional experience. By allowing the user to also select in some manner the particular human figure that is to wear the garment, an individualized experience is provided that allows the user to see what selected clothes look like when worn by different people.

The degree to which the system takes into account the physical forces acting on a garment as it is worn determine in large part how visually realistic the computer-generated images are. Simulation of the draping and collision of a garment object with a mannequin using a three-dimensional modeling environment (e.g., Maya, manufactured by Alias Wavefront of Toronto, Canada) allows the rendering of a two-dimensional image of the mannequin and garment that is quite realistic in appearance. It is desirable in a simulated dressing environment, however, for a user to be able to select among a variety of different mannequins and/or garments for displaying. Accordingly, a simulated dressing environment could be implemented with a three-dimensional modeling environment simply by simulating particular dressing scenes in response to user inputs and then rendering two-dimensional images directly from the simulation scene. The massive amount of computation required to perform a collision and draping simulation for any particular mannequin and garment, however, makes three-dimensional modeling an impractical way by itself in most commonly available computing environments to generate the multiple images of different mannequins and garments needed to implement a dressing environment.

SUMMARY OF THE INVENTION

A primary aspect of the present invention is a method for efficiently producing images of a computer-simulated mannequin wearing a garment or garments, the geometries of which are defined by selected mannequin and garment parameter values. An image, as the term is used herein, includes any spatial function derived from a perspective projection of a three-dimensional scene either existing in the real world or as modeled by a computer. This definition includes not only the usual two-dimensional intensity image, such as that formed upon the human retina when viewing a scene in the real world or that captured on photographic film through a camera aperture, but also two-dimensional functions incorporating both intensity and phase information for use in wavefront reconstruction (i.e., holograms). The present invention primarily deals with digital images (i.e., discrete two-dimensional functions) derived from three-dimensional scenes by the process of rendering. An image should therefore be taken to mean any form of such rendered data that is capable of being represented internally by a computer and/or transmitted over a computer network. When referring specifically to a visually informative representation that can actually be perceived by the human eye, such as that produced on a computer display, the term visual image will be used.

In one embodiment, the present invention includes performing a draping and collision of a garment with a mannequin within a three-dimensional simulation scene to generate a rendering frame from which an image of a mannequin wearing a garment can be rendered, and further includes generating rendering frames containing mannequins and garments as defined by selected parameter values by shape blending the mannequins and/or garments of previously generated rendering frames. Linear combinations of the parameter values of previously generated rendering frames (e.g., as produced by interpolating between such values) are thus used to generate rendering frames with the desired mannequin and garment.

In another embodiment, the invention includes the generation of a rendering frame containing a mannequin wearing a particular garment from a collision and draping simulation and the further addition of garment constraints corresponding to particular predefined shells around the mannequin that mimic the way the garment behaves when worn with another particular garment. These garment constraints are defined so as to conform to various dressing conventions or rules relating to how clothes are worn, e.g., the wearing of a coat over a shirt. Rendering frames corresponding to different versions of a garment may thus be produced, where the information contained within separately generated rendering frames corresponding to particular versions of garments can then be used to produce a composite image of the garments worn in combination. For example, images can be rendered separately from each such rendering frame and layered upon one another in an appropriate order, or a composite image can be rendered using the depth information contained in each rendering frame. In this way, mixing and matching of garments on a mannequin is facilitated.

Another embodiment of the invention relates to a computerized dressing environment for displaying a selected garment worn by a selected mannequin in which garment images rendered from a three-dimensional simulation scene are stored in a repository and displayed in accordance with user inputs. The garment images include images of a plurality of garments, including versions of garments, and renderings of each garment from a plurality of viewpoints so as to provide a three-dimensional experience to the user. In order to display a selected mannequin wearing selected multiple garments, garment images corresponding to particular versions are selected in accordance with versioning rules by a versioning rule interpreter. The appropriate garment images are then layered upon an image of a selected mannequin to create a composite image. The layering order of the garment images is dictated by compositing rules derived from dressing conventions. Another embodiment of the invention relates to a method for efficiently populating such a garment image repository with garment images by using the methods described above.

Other objects, features, and advantages of the invention will become evident in light of the following detailed description of exemplary embodiments according to the present invention considered in conjunction with the referenced drawings.

BRIEF DESCRIPTION OF THE DRAWINGS

FIG. 1C shows the final frame of a simulation scene after simulation of draping and collision of a garment with a mannequin and animation of the mannequin to a display pose.

DETAILED DESCRIPTION OF THE INVENTION

Figure 1B:
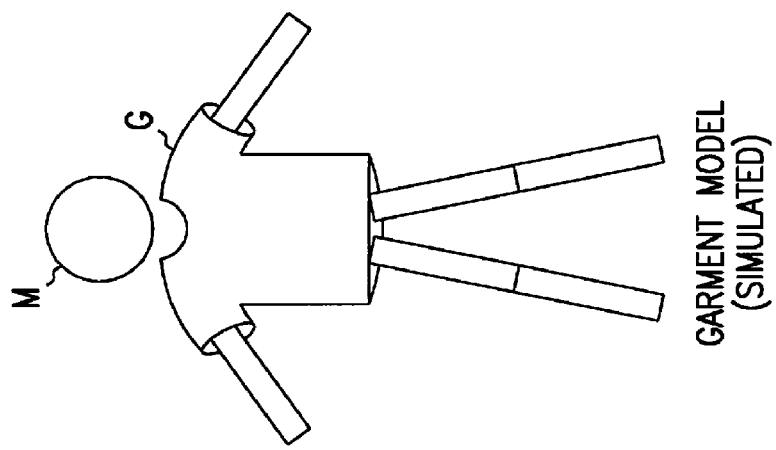
FIG. 1B shows the initial frame of a simulation scene in which the garment is placed over the mannequin in a dressing pose.
Figure 1B:
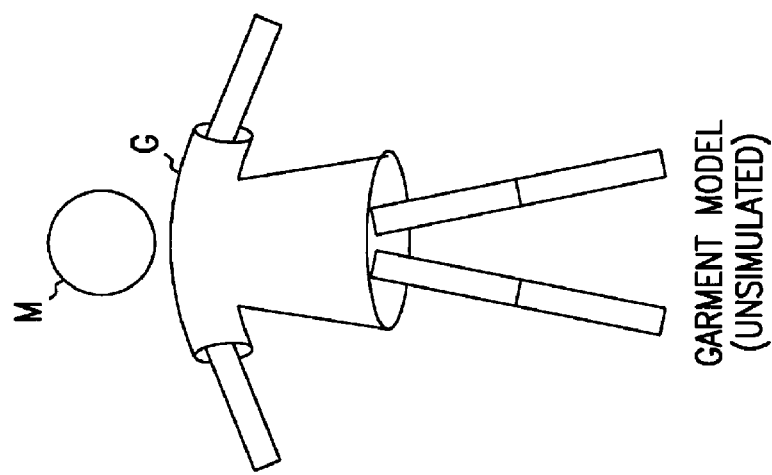

The present invention is a system and method for efficiently providing a computer-simulated dressing environment in which a user is presented with an image of a selected human figure wearing selected clothing. In such an environment, a user selects parameter values that define the form of the human figure, referred to herein as a virtual mannequin, that is to wear the selected clothing. Such parameters may be actual body measurements that define in varying degrees of precision the form of the mannequin or could be the selection of a particular mannequin from a population of mannequins available for presentation to the user. One type of user may input parameter values that result in a virtual mannequin that is most representative of the user's own body in order to more fully simulate the experience of actually trying on a selected garment. Other types of users may select mannequins on a different basis in order to obtain images such as for use in animated features or as an aid in the manufacturing of actual garments. The particular garment to be worn by the virtual mannequin is selected from a catalogue of available garments, where each garment may be further selected according to, e.g., style, color, or physical dimension.

In order to provide a more realistic representation of the physical fitting of the garment on the mannequin, an image of a virtual mannequin wearing selected garments is generated by using a three-dimensional modeling environment that provides a cloth simulation of the garment interacting with the mannequin. This provides a more visually accurate representation presented to the user in the form of a two-dimensional image rendered from the three-dimensional model. The simulation is performed by constructing three-dimensional models of the garment and mannequin using vector or polygon-based graphics techniques, referred to as garment and mannequin objects, respectively, and placing the garment and mannequin objects together in a three-dimensional simulation scene. A scene in this context is a three-dimensional data structure that is made to contain one or more three-dimensional objects and defines their relative position and motion. Such a scene may be organized into a number of frames representing discrete points during a simulation or animation sequence. An image may be rendered from a frame by computing a perspective projection of the objects contained in the scene in accordance with a specified viewpoint and lighting condition.

After constructing a simulation scene containing the mannequin and garment, the garment is fitted on the mannequin by simulating the draping and collision of the garment with the mannequin due to physical forces. Such a simulation may facilitated by modeling garments as individual panels corresponding to the sewing patterns used to construct the actual garments, where the panels are closed surfaces bounded by curved or straight lines. Texture mapping may be used to map different cloth fabrics and colors, and ornamental details such as buttons, collars, and pockets to the garment object in the simulation scene. One or more rendering frames are then created by performing a draping and collision simulation of the garment with the mannequin, which includes animating the mannequin from a dressing pose to a display pose. The animation takes place within the three-dimensional modeling system that simulates motion and collision of the cloth making up the garment as the mannequin moves. A two-dimensional image for presentation to the user may then be rendered from the rendering frame in accordance with a selected camera position that determines the particular view that is rendered. In certain embodiments, the simulation may provide for a plurality of display poses by the mannequin with rendering frames generated for each such display pose.

It is desirable for the simulated environment to have the capability of displaying a number of different mannequins wearing garments of different dimensions. One way of providing this functionality is to perform the simulation and rendering as described above separately and in real-time for each selected mannequin and garment. Simulating the draping and collision of a garment with a mannequin is computationally intensive, however, and real-time simulation may thus not be practical in most situations. In order to reduce the computational overhead associated with displaying multiple mannequins or garments of selected dimensions, the simulation may be fully performed with representative mannequins and garments defined by reference parameters to generate three-dimensional reference rendering frames. Shape blending techniques are used to modify the mannequin and/or garment parameters to desired selected values by interpolating between the corresponding parameter values of reference rendering frames. In accordance with the invention, garment and/or mannequin parameter values corresponding to the desired changes are modified within a rendering frame, and a partial further simulation is performed that creates a new rendering frame containing the changed mannequin and/or garment. For example, the dimensions of the individual panels making up the garment may be changed, with the resulting panels being then blended together within the simulation environment. Similarly, the dimensions of a mannequin may be changed by blending the shapes of previously simulated mannequins. The parameters are thus keyframed within the simulation sequence, where keyframing, in this context, refers to assigning values to specific garment or mannequin parameters in a simulation scene and generating a new frame using a linear combination of parameter values (e.g., interpolation or extrapolation) generated from a previous simulation. In this way, a new rendering frame is generated that contains a mannequin with different measurements and/or a garment with a different dimensions as selected by the user. Thus, the simulation need only be fully performed once with a representative garment and mannequin, with keyframing of parameter values within the three-dimensional modeling system being used to generate rendering frames containing a particular mannequin and garment as selected by a user. Simulation of the modified garment interacting with the mannequin as the partial further simulation takes place requires much less computation than a complete resimulation of the draping and collision of a changed garment over a mannequin. Only when the user selects a garment or mannequin that cannot be generated by linearly combining parameters from a previously generated rendering frame does a full draping and collision simulation need to be performed.

Another desirable feature of a simulated dressing environment is for the user to be able to display a mannequin wearing multiple selected garments (e.g., outfits). In one embodiment of the invention, images of a mannequin wearing multiple selected garments are generated by simulating the simultaneous draping and collision of multiple garments with the virtual mannequin in a single simulation scene to create a single rendering frame. In this embodiment, dressing rules may be used that dictate how garments should be layered in the simulation scene in accordance with dressing conventions. Changes to the mannequin and/or garment can then made to the rendering frame by the keyframing and partial further simulation technique described above. The two-dimensional image of the mannequin wearing the multiple garments could then be rendered using the Z-coordinates (where the Z-coordinate represents depth in the three-dimensional model) of the mannequin and garment objects in the rendering frame. Such rendering using Z-coordinates may be performed, for example, based on individual pixels (Z-buffering) or by sorting individual polygons based upon a representative Z-coordinate.

As noted above, however, draping and collision simulation is computationally intensive, and even more so in the case of multiple garments, making simulation of user-selected mannequins wearing selected multiple garments in real time in order to render images therefrom impractical in most situations. Therefore, in a presently preferred embodiment of the invention, two-dimensional images of mannequins and single garments are pre-rendered from rendering frames generated as described above and stored in a repository for later display in response to user inputs, where the garment images correspond to a plurality of different garments and views of such garments. The methods described above enable such a repository to be efficiently populated. In addition, in order to avoid the computational complexity of pre-rendering two-dimensional images corresponding to every possible combination of multiple garments on every possible mannequin, multiple versions of single garments may be defined which are then simulated and rendered into two-dimensional images, where the two-dimensional renderings of specific garment versions may then be combined with renderings of specific versions of other garments according to versioning rules. Such versions of garments enable the garment images rendered from separate simulations to be combined in a composite image.

Particular versions of particular garments are simulated and rendered into two-dimensional garment images in a manner that mimics the physical interaction between multiple garments in a simultaneous draping and collision simulation. An approximation to such a simulation is effected by creating each version of a garment in a manner such that the garment is constrained to reside within or outside of particular pre-defined shells defined around the mannequin. Different versions of a garment are created by first simulating the draping and collision of a representative garment with a mannequin as described above. Shells are then defined around the mannequin, and portions of the garment are constrained to reside either inside or outside of particular shells according to the particular version being created. Versioning rules then define which versions of the garment objects are to be used when particular multiple garments are selected to be worn together by the mannequin. Collisions of multiple garments with one another are thus resolved in a manner that allows single garments to be independently simulated and rendered for later combination into a composite image. Such combination may be performed by layering the images in a prescribed order or by using the depth information contained in the rendering frame of each garment.

The pre-rendered two-dimensional garment images are then combinable into a composite display, with the particular version images to be used being chosen by a version rule interpreter that interprets the versioning rules. Such two-dimensional images of garment versions are generated for all of the possible mannequins and single garments that the user is allowed to select for display. A repository of two-dimensional images is thus created where the individual images can be layered upon one another in order to display a selected mannequin wearing selected multiple garments. The two-dimensional images are layered upon one another in a prescribed order to create the final composite two-dimensional image presented to the user. The layering is performed using a rule-based interpreter that interprets compositing rules that define in what order specific garments should be appear relative to other garments. Such compositing rules are based upon dressing rules that define the how clothes are conventionally worn. For example, one such dressing rule is that jackets are worn over shirts, and the corresponding compositing rule would be that the rendering of a jacket should be layered on top of the rendering of a shirt.

Independently pre-rendering single garments also allows for the computational overhead to be further reduced by generating a rendering frame with a representative mannequin and garment, and then modifying the garment and/or mannequin by keyframing the garment and/or mannequin parameter values in a rendering frame and performing a partial further simulation of the interaction of the modified garment with the mannequin as described above. The two-dimensional images derived from the rendering frames may also include renderings from a plurality of camera positions. A user may then select a particular viewing perspective in which to view the selected mannequin wearing selected multiple garments, with the pre-rendered images used to make up the composite image being rendered from the camera position corresponding to that viewing perspective. The pre-rendering procedure can thus be performed for a population of mannequins and for a plurality of different garments and versions of garments at a plurality of camera positions to generate a repository of two-dimensional garment images that may be combined together in response to user selection of garment and/or mannequin parameter values.

In accordance with the invention, a system for displaying a selected computer-simulated mannequin wearing a selected garment includes a user interface by which a user selects a mannequin image and one or more garments to be worn by the mannequin from a repository of pre-rendered garment images, the mannequin image and garment images then being combined to form a composite image. The system then further includes a versioning rule interpreter for choosing among versions of the garment images for displaying in accordance with versioning rules that define which versions of particular garments are permitted when combined with another particular garment. Versions of garment images may also be defined which differ in a fitting characteristic (e.g., loose, snug, etc.) or a wearing style (e.g., shirt tucked in or out, sweater buttoned or unbuttoned, etc.) A compositing rule interpreter is provided for displaying the two-dimensional images of versions of user-selected garments chosen by the versioning rule interpreter and of a selected mannequin in a layered order dictated by compositing rules.

In a presently preferred exemplary embodiment of the invention to be described further below, a repository of garment images is created which can be drawn upon to provide a simulated dressing environment for displaying a selected computer-simulated mannequin wearing selected garments. In such a system, a user interface enables the user to select a particular mannequin (e.g., derived from specified body measurements) and particular garments to be worn by the mannequin. Certain embodiments may allow the user to also specify the viewpoint of the image eventually rendered to a display and/or the display pose of the mannequin. Exemplary applications of the dressing environment include its use as part of a computerized catalogue in which users select particular garments to be worn by particular mannequins and as a tool for use by animators to generate images of dressed mannequins that can be incorporated in an animation sequence. The dressing environment can also be used to simulate the appearance of garments as an aid to the manufacture of actual garments from predefined sewing patterns.

In one embodiment, the garment images are two-dimensional images of garments that are pre-rendered from three-dimensional rendering frames generated by simulating the draping and collision of a garment with a mannequin in a three-dimensional modeling environment. The repository contains garment images that differ according to garment type, style, dimensions, and the particular mannequin which is to be shown wearing the garment. Additionally, different versions of each garment are provided which are generated so as to be combinable with other garment images on a selected mannequin by layering the garment images on a two-dimensional image of a selected mannequin in a prescribed order. Versions of garments are also defined that differ according to a fitting characteristic (e.g., loose fit, snug fit, etc.) or a wearing style (e.g., buttoned, unbuttoned, tucked in or out, etc.). Finally, the repository contains the garment images rendered from a plurality of camera positions. A user is thus able to dress a selected mannequin with selected garments and view the mannequin from a plurality of angles. In another embodiment, pre-rendered images corresponding to a plurality of mannequin display poses are also stored in the repository. In another alternate embodiment, rendering frames are stored in the repository after extraction of the garment object. After retrieving the appropriate garment from the repository (i.e., according to user selection and in accordance with versioning rules), an image can be rendered from an arbitrary camera position. Because the displayed images are ultimately derived from three-dimensional simulations, a visually realistic experience is provided to the user but in a much more efficient manner than would be the case if the simulations were performed in real time.

Figure 1A:
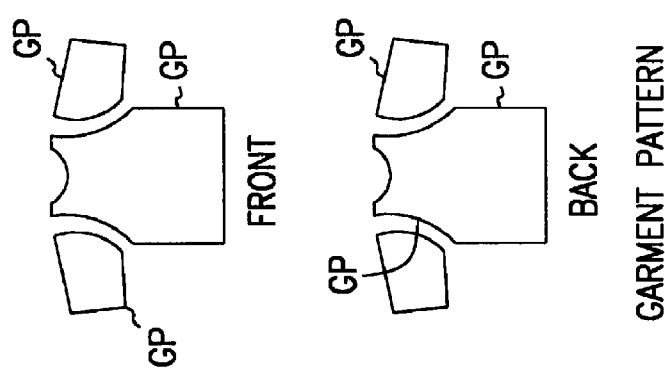
FIG. 1A shows the panels of a garment object within a simulation scene.

During the simulation process, a three-dimensional simulation scene is created from which one or more three-dimensional rendering frames can be generated. Garment images are then rendered from the rendering frames. Referring first to FIGS. 1A through 1C, three stages of the simulation process are shown in which objects corresponding to a garment and a mannequin are generated and placed within a three-dimensional scene. FIG. 1A shows a garment object made up of a plurality of garment panels GP, where the panels can be defined with respect to shape and dimension so as to correspond to the sewing patterns used to construct an actual garment. In the Maya modeling environment, for example, a panel is defined as a region enclosed by two or more NURBS curves which are joined together and tessellated to form a garment. The garment panels GP and a mannequin M are then placed together in a three-dimensional scene as shown in FIG. 1B, where the mannequin is shown in a dressing pose and the garment panels are placed at positions around the mannequin appropriate for the subsequent simulation. FIG. 1C shows the three-dimensional scene after the simulation process has completed. During the simulation, the garment panels GP are joined together (i.e., corresponding to the stitching of sewing patterns) to form the garment G. The draping and collision of the garment G with the mannequin M due to physical forces is also simulated, and the mannequin is animated from the dressing pose to a display pose with motion of the garment being concomitantly simulated.

Figure 2:
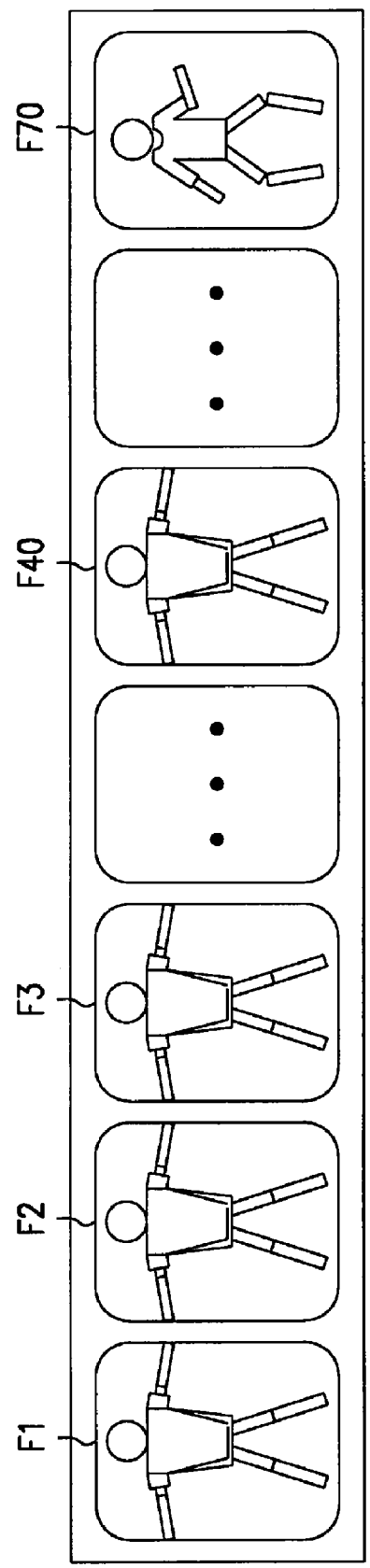
FIG. 2 shows the frames of a simulation scene as a simulation progresses.

FIG. 2 shows a number of representative frames F1 through F70 of the simulation scene as the simulation progresses. Frame F1 corresponds to the initial sewing position as previously depicted in FIG. 1B, and frames F2 and F3 show the progression of the draping and collision simulation which culminates at frame F40 in which the completed garment G is fitted over the mannequin M in the dressing pose. The simulation further progresses to frame F70 where the mannequin M is animated to move to a display pose, moving the garment G along with it. Frame F70 thus forms a rendering frame from which a two-dimensional image of the garment G can be rendered and deposited into the repository as a garment image. As noted earlier, in one particular embodiment rendering frames corresponding to a number of different display poses may be generated.

For each type of garment G (i.e., shirt, pants, coat, etc.), a rendering frame can be generated as described above, and a garment image corresponding to the garment type is generated. In order to reduce the computational overhead involved in generating garment images that differ only with respect to certain garment parameter values such as garment dimensions and style, or with respect to mannequin parameter values that define the particular mannequin with which the draping and collision simulation of the garment takes place, a full draping and collision simulation starting with the garment panels is first performed for each garment type with a reference garment and a reference mannequin to thereby generate a reference rendering frame. The mannequin and/or garment parameter values are then modified in the reference rendering frame, with the geometry of the scene then being updated by the cloth solver in accordance with the internal dynamic model of the modeling environment. The three-dimensional modeling environment generates the modified mannequin and/or garment objects as linear combinations of parameters calculated in the prior reference simulation so that a full resimulation does not have to be performed. Thus only a partial resimulation needs to be performed to generate a new rendering frame containing the modified mannequin and/or garment.

Figure 3:
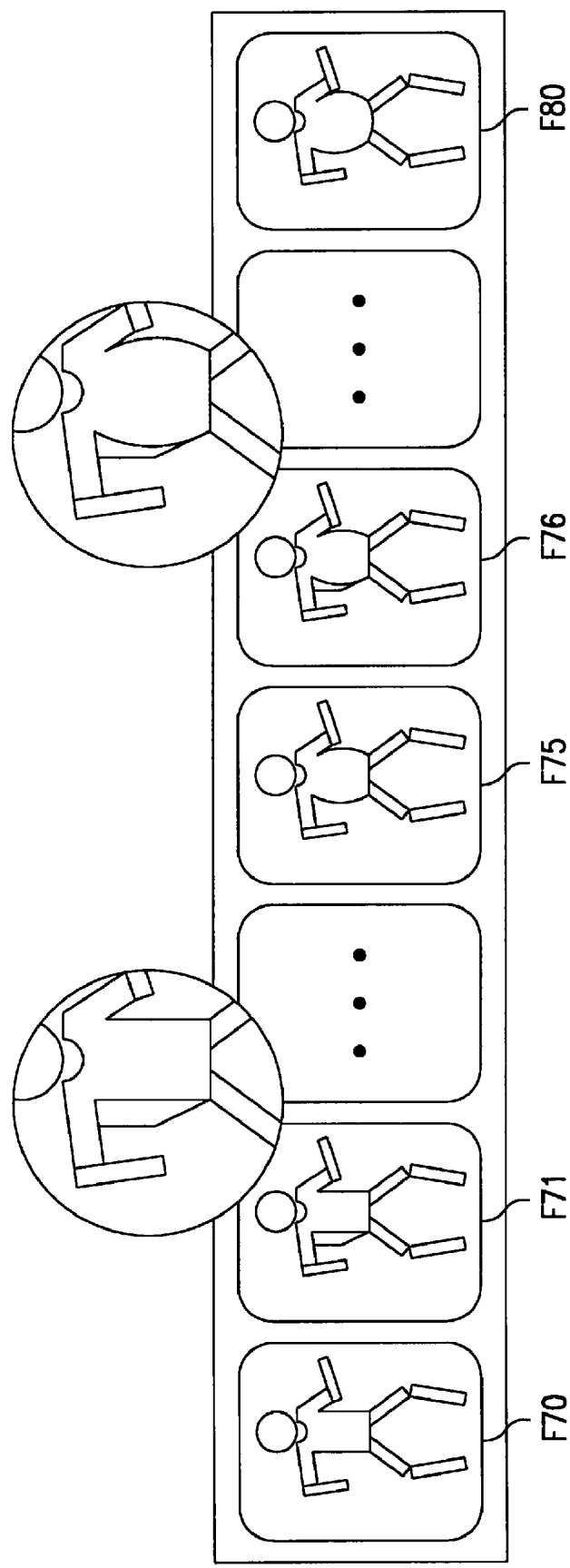
FIG. 3 shows the modifying of object parameters within a rendering frame and =performance of a partial further simulation to generate a modified rendering frame.

FIG. 3 shows a number of representative frames F70 through F80 of a resimulation scene showing the parameter modifying and partial resimulation process. Frame F70 is the reference rendering frame, having been previously generated with a reference mannequin and garment as described above, and from which garment images corresponding to the reference garment can be rendered. At frame F71, parameter values of the mannequin M or the garment G are modified while the simulation process is temporarily halted. Such parameter values that can be modified at this point include various dimensions of the mannequin M as well as dimensions and shapes of the garment panels GP that make up the garment G. The simulation is then restarted with the modified parameter values which completes at frame F75. The three-dimensional modeling environment is able to retain the information produced as a result of the reference simulation so that the coordinates of the mannequin and garment objects at frame F75 are solved without doing a complete draping and collision simulation with the modified parameters. Frame 75 can then be employed as a rendering frame for the modified garment and/or mannequin with a garment image rendered therefrom. Frame F76 of FIG. 3 shows how the garment and mannequin parameters can be further modified from those of the rendering frame in frame F75, with partial resimulation performed to generate a sequence of frames ending at frame F80. The procedure can then be repeated as needed to in order to generate garment images corresponding to any number of modifications made to the garment and/or mannequin. In this way, the repository of garment images can be efficiently populated with garments of different dimensions suitable for layering on a mannequin chosen from a population of mannequins of different dimensions.

Figure 4:
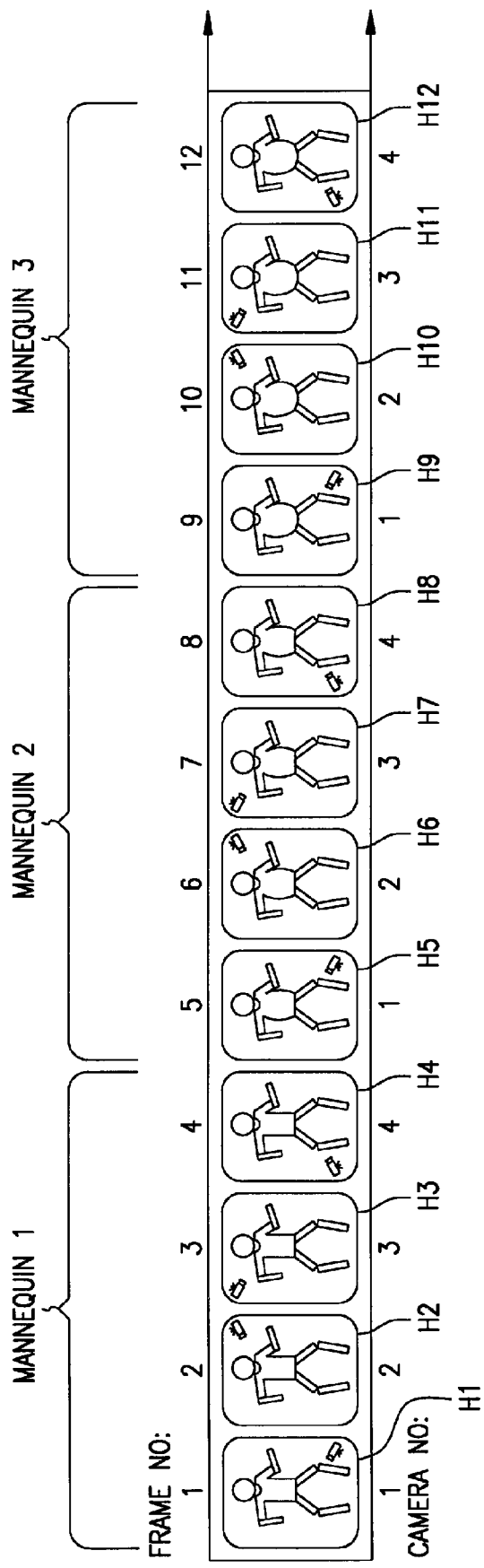
FIG. 4 shows the rendering of garment images from rendering frames with different camera positions.
Figure 5:
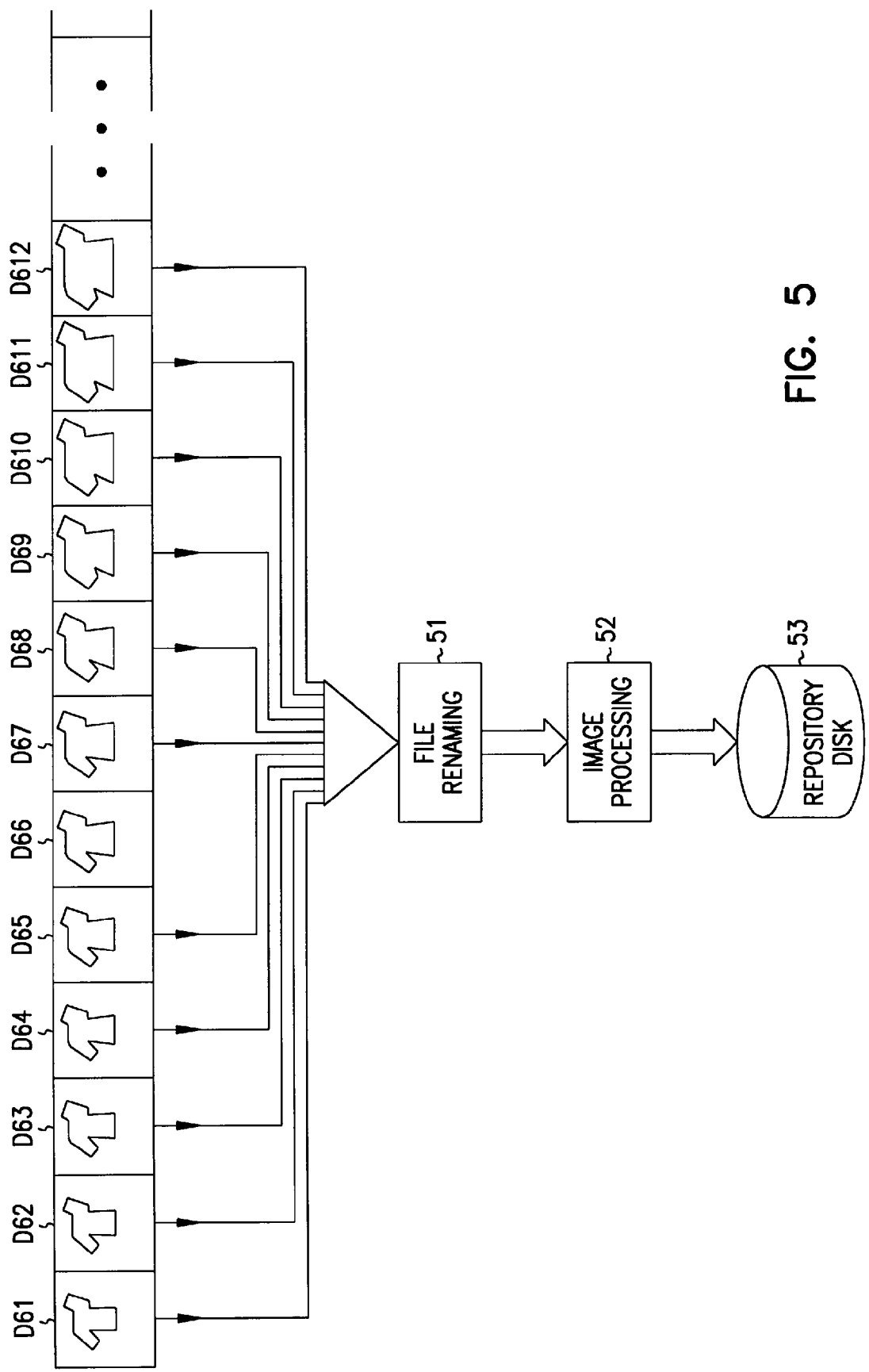
FIG. 5 shows a plurality of pre-rendered garment images and the process steps for storing the images in a repository.

As noted above, the population of garment images in the repository includes renderings of each garment from a plurality of viewing angles in order to simulate the three-dimensional experience for the ultimate user. FIG. 4 shows how garment images corresponding to different viewing perspectives are created from rendering frames by turning on different cameras for the rendering process. (A camera in this context is the viewing position within the scene from which an image is rendered.) Shown in the figure are a plurality of rendering frames H1 through H12 generated as described above for three different garments (i.e., garments differing according to type or garment parameter values) as fitted on three mannequins. Frames H1 through H4 are rendering frames generated for a particular garment and mannequin that differ only in the particular camera C1 through C4 which is turned on. Rendering the garment object from each of the four frames then produces four views of the garment, designated garment images DG1 through DG4 as shown in FIG. 5. Similarly, rendering the garment objects from frames H5 through H9 and frames H9 through H12 produces four perspective views of each of those garments, also shown in FIG. 5 as garments DG5 through DG12.

FIG. 5 shows that the garment images DG1 through DG12 are two-dimensional graphics files that go through a sequence of steps before being stored in the repository. First, the files are named and catalogued at step 51 so as to be accessible when needed to generate a particular composite image. Next, image processing is performed at step 52 to convert the files to a desired image file format (e.g., jpeg, tiff, gif) which may or may not include data compression. Finally, the files are stored in the repository (e.g., located on a hard disk or other appropriate storage medium) at step 53.

Figure 6:
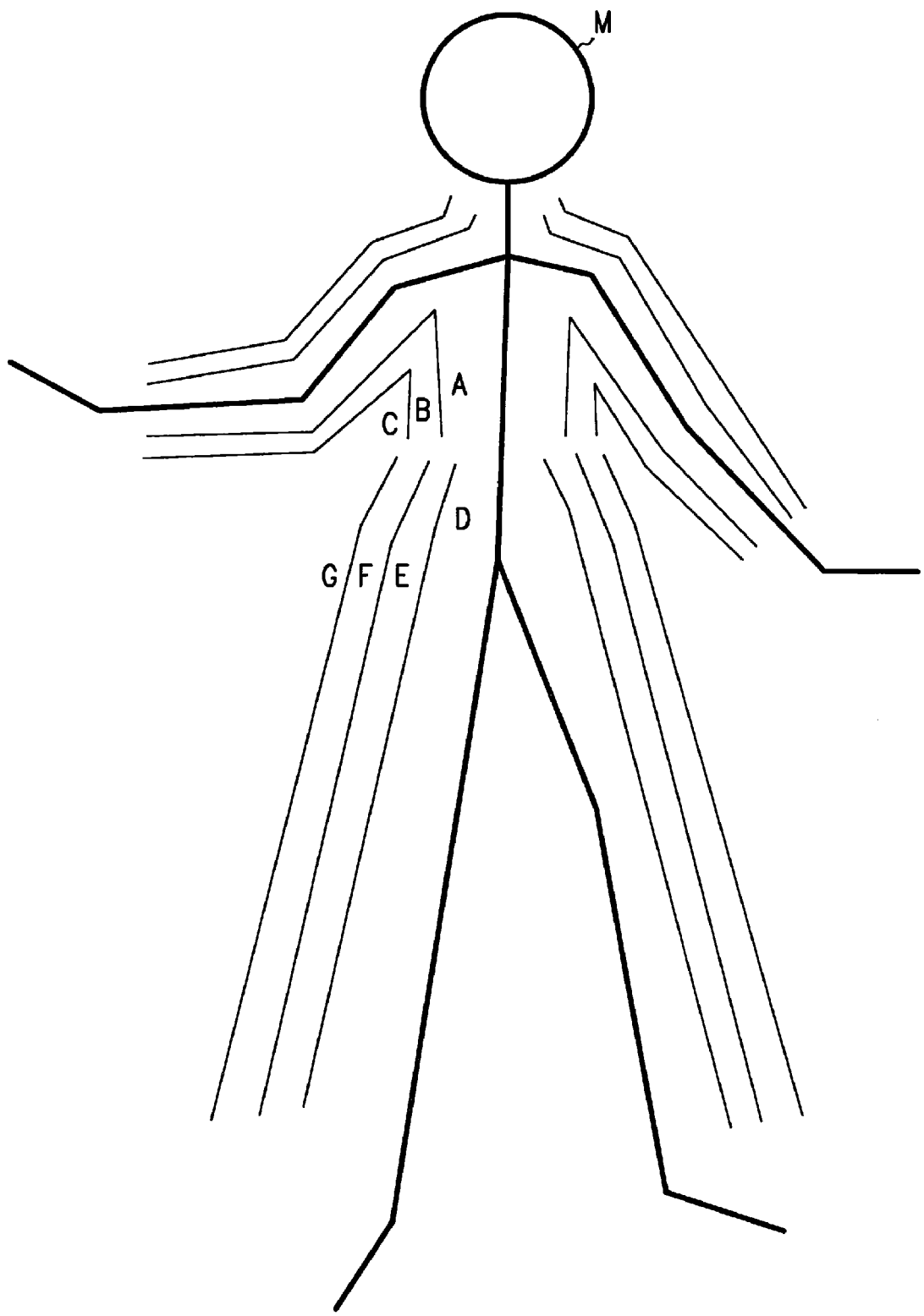
FIG. 6 shows constraining shells defined around a mannequin that are used in defining particular versions of a garment.
Figure 7A:
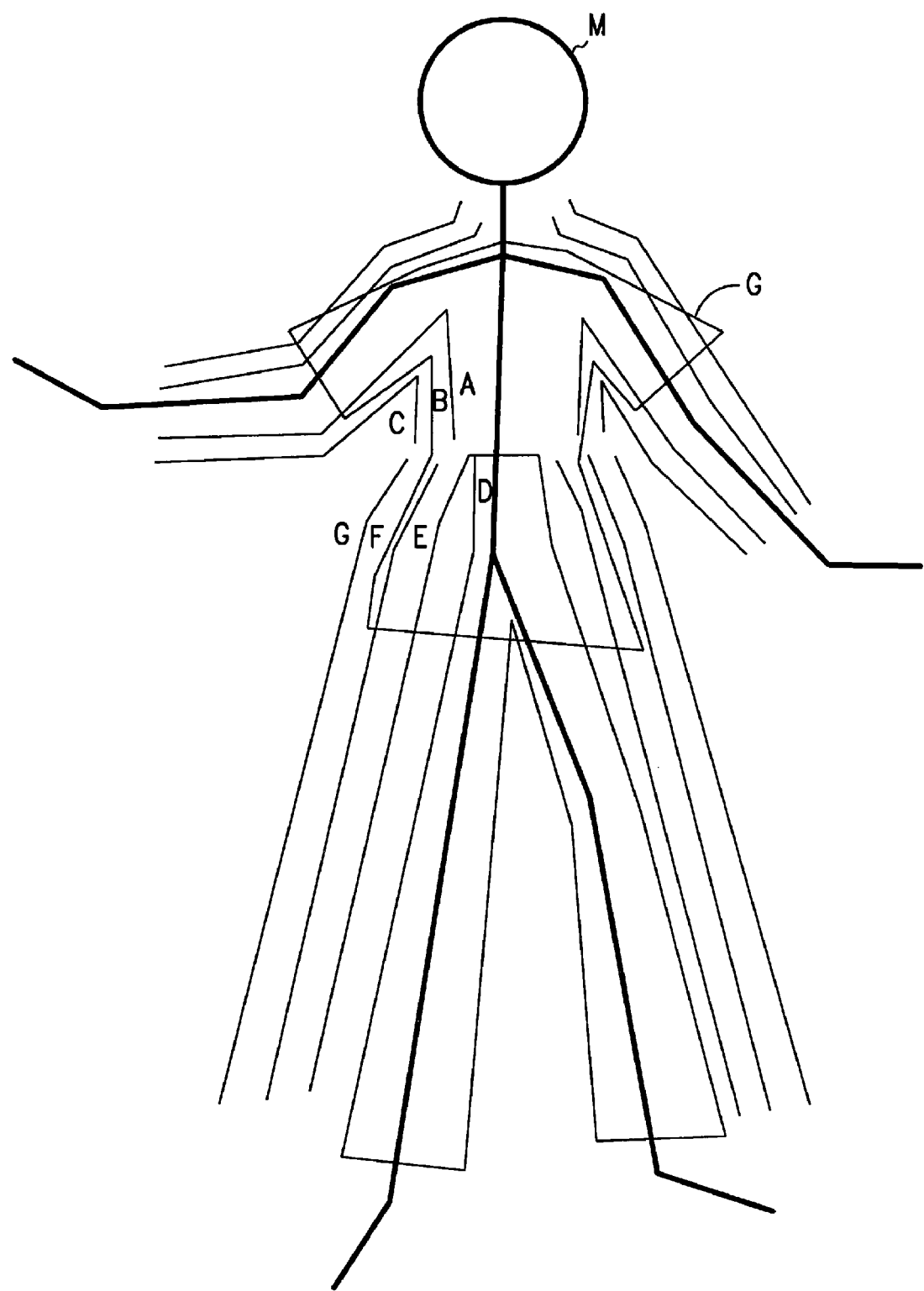
FIGS. 7A through 7C show multiple versions of a garment as defined within a rendering frame.
Figure 7B:
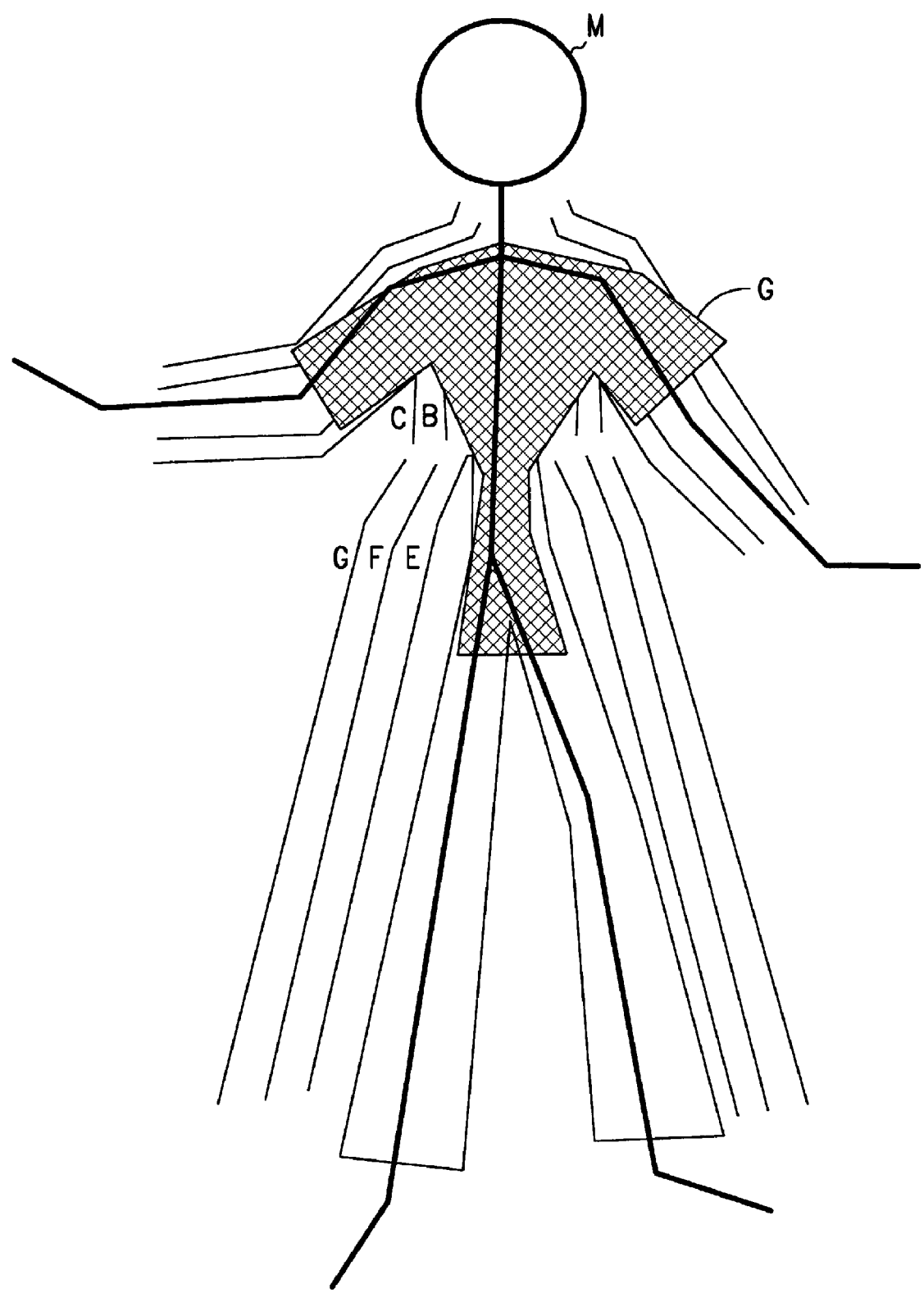
Figure 7C:
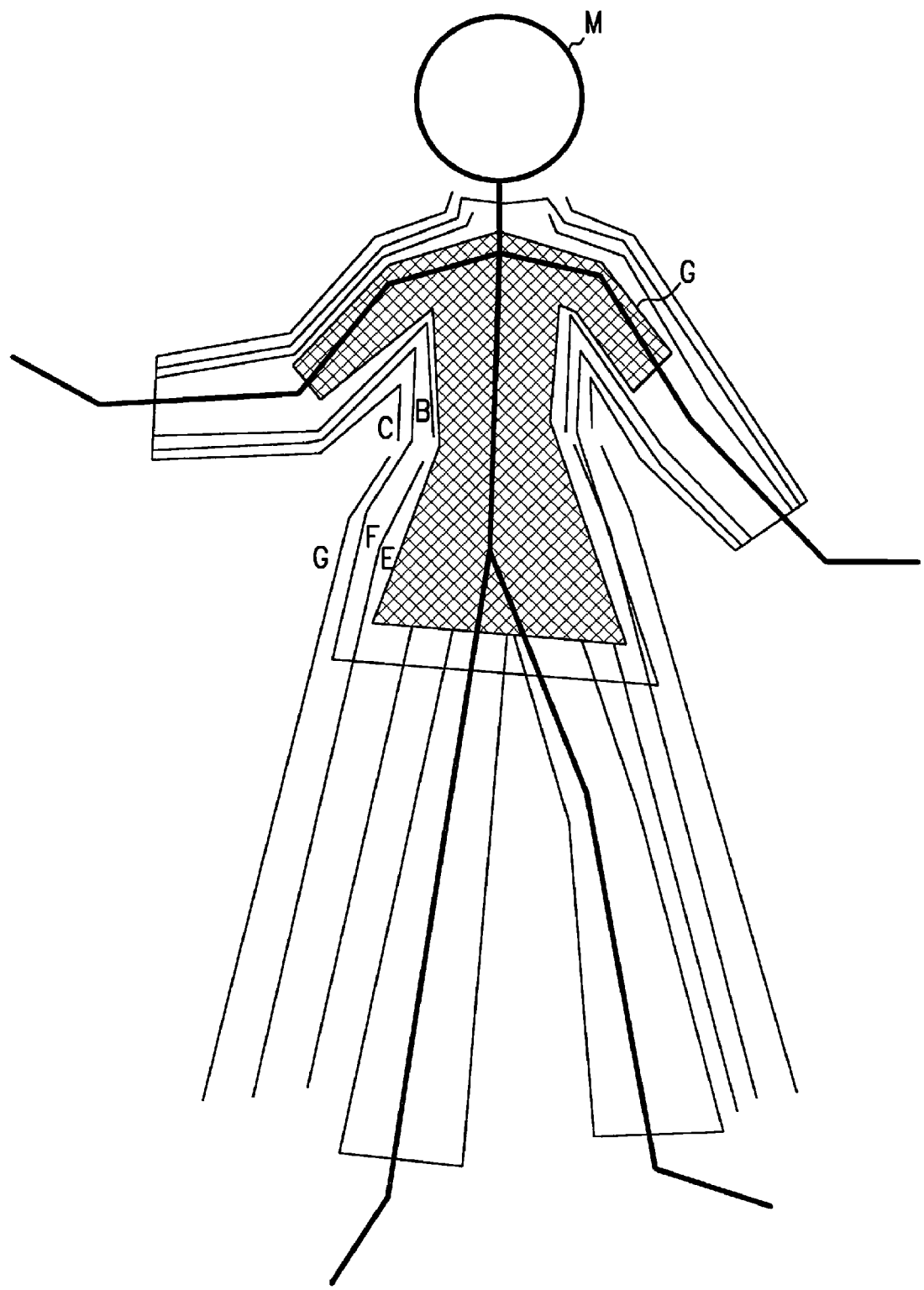

As noted above, a plurality of different versions of each garment image are created and stored in the repository in order to enable multiple garment images to be layered on a two-dimensional rendering of a mannequin, with the garments being rendered from rendering frames in an independent manner. Each version is defined to be combinable with one or more particular garments and is rendered from a rendering frame in which the garment is constrained to reside within or outside of particular predefined shells around the mannequin. The constraining shells serve to mimic the collisions with another garment that would take place were a simulation to be performed with that other garment. FIG. 6 shows a mannequin M around which are defined a plurality of shell regions (i.e., regions within or outside of particular shells) designated A through G that represent a plurality of offset distances from the mannequin. A version of a garment is constructed by constraining portions of the garment in a rendering frame to reside within or outside of particular shells. The particular constraints chosen for a version are designed to correspond to where the portions of the garment would reside were it to be collided with another particular garment in a simulation scene. FIGS. 7A through 7C show three versions of a representative garments G in which portions of the garment in each version have been constrained to reside within or outside of particular shells. Garment images may then be rendered from the version rendering frame at a plurality of camera angles to correspond to different views of the garment version. Creating versions of garments at the level of the rendering frame instead of in the two-dimensional garment image itself permits large numbers of viewing perspective renderings to be generated from a single version rendering frame in a consistent manner.

Figure 8A:
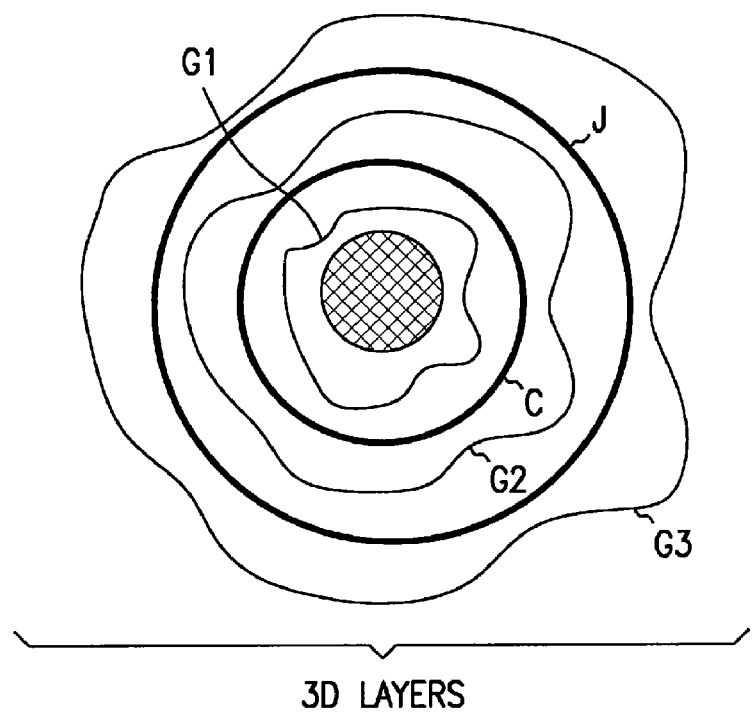
FIGS. 8A and 8B show a depiction of the rendering frames for two garments and the corresponding garment images rendered therefrom as displayed in layers
Figure 8B:
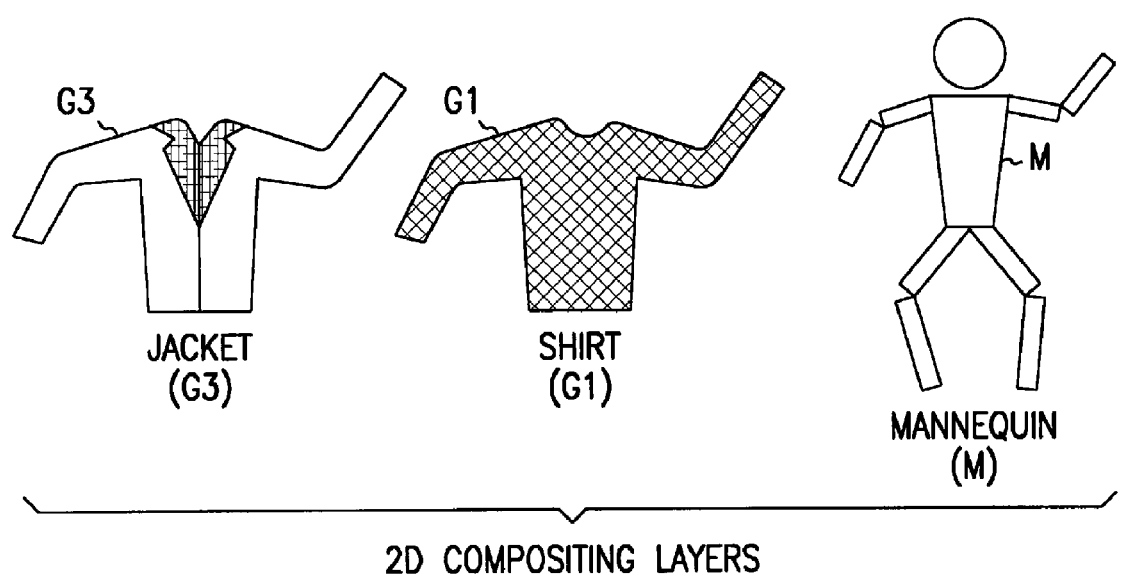
Figure 9:
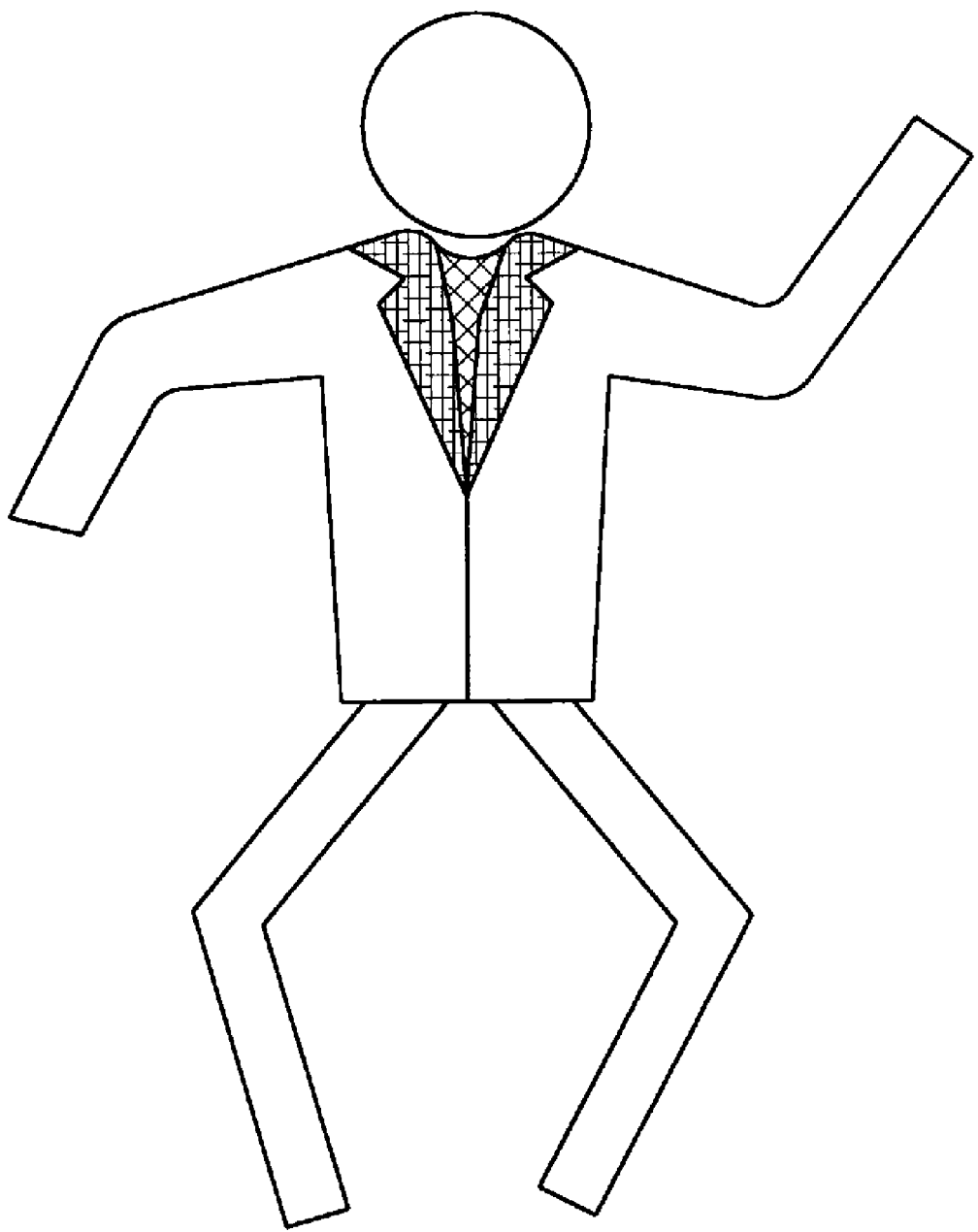
FIG. 9 shows a composite image made up of multiple garment images.

When a composite display showing the mannequin wearing multiple selected garments is to be generated by the dressing environment, a versioning rule interpreter selects particular versions of the garments to be displayed in accordance with predefined versioning rules. A compositing rule interpreter then displays the two-dimensional images of the selected garments and of a selected mannequin in a layered order dictated by compositing rules. To illustrate by way of example, FIG. 8A shows a plurality of shells surrounding a mannequin M as seen from above, with portions of a jacket garment G3 and a shirt garment G1 constrained to reside within or outside of shells C and J. FIG. 8A thus represents what a combination of the two separate rendering frames containing garments G1 and G3 would look like. When garments G1 and G3 are selected to be worn by the mannequin, the versioning rule interpreter selects particular versions of those garments from the garment image repository in accordance with a versioning rule. In this case, the versioning rule would select the versions of the jacket G3 and shirt G1 that have been rendered from rendering frames with the garments constrained as shown in FIG. 8A which ensures that any rendering of the jacket G3 will reside outside of a rendering from the same camera angle of shirt G1. FIG. 8B shows the two-dimensional garment images of garments G1 and G3 that have been retrieved from the repository in accordance with the versioning rules and a two-dimensional mannequin image M. The compositing rule interpreter displays the images in a layered order as defined by a compositing rule which, in this case, dictates that the jacket image G3 will be layered on top of the shirt G1, both of which are layered on top of the mannequin image M. FIG. 9 shows a composite image as would be presented to a user as a result of the layering process.

Figure 10:
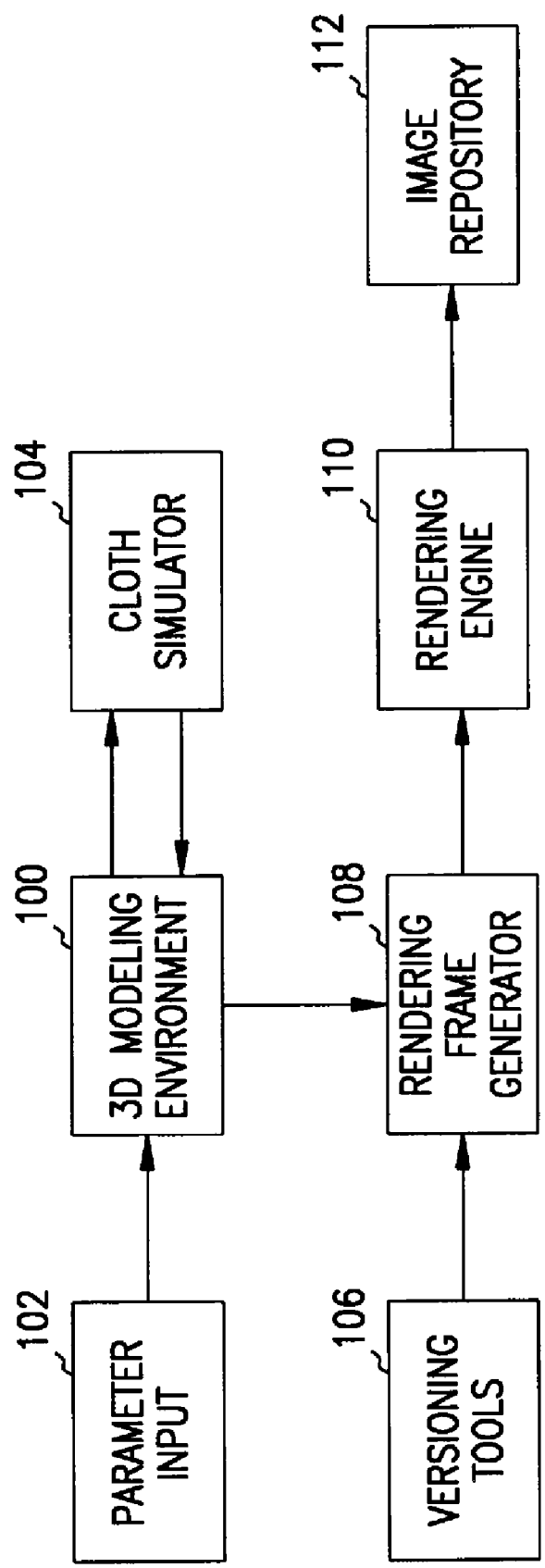
FIG. 10 is a block diagram showing the components of a system for populating a repository with images.

The above-described preferred embodiment has thus been described as a system and method in which images of garments and mannequins that have been pre-rendered from frames of three-dimensional simulation scenes are stored in a repository for selective retrieval in order to from composite images. FIG. 10 shows in block diagram form the primary software components of an image generation system for populating a repository with images. A three-dimensional modeling environment 100 in conjunction with a cloth simulator 104 are used to simulate the draping and collision of a garment with a mannequin. (An example of a three-dimensional modeling environment and cloth simulator is the aforementioned Maya and Maya Cloth.) A parameter input block 102 inputs user-defined parameters (e.g., from a display terminal) into the modeling environment in order to define the garment and mannequin parameters as described above for the simulation. A rendering frame generator 108 communicates with the modeling environment 100 in order to extract rendering frames therefrom. The rendering frame generator 108 also works with the modeling environment to perform shape blending upon reference rendering frames in order to generate frames with modified parameters without performing a full simulation. Versioning tools 106 are used within the rendering frame generator to create the particular versions of the garments that are combinable with other garments according to versioning rules. The versioning tools 106 interface with the three-dimensional modeling environment (e.g., as a C/C++ shared object library in conjunction with scripts written in a scripting language of the three-dimensional modeling environment such as the Maya Embedded Language) and enable a user to define garment shells and associate simulation properties (e.g., collision offset, cloth stiffness, cloth thickness) to garments and mannequins within the simulation. Images of garments and mannequins are rendered from the rendering frames at a selected viewpoint by the rendering engine 110. The images are then converted to a convenient file format, named, and catalogued to enable access by the display system, and stored in the image repository 112.

Figure 11:
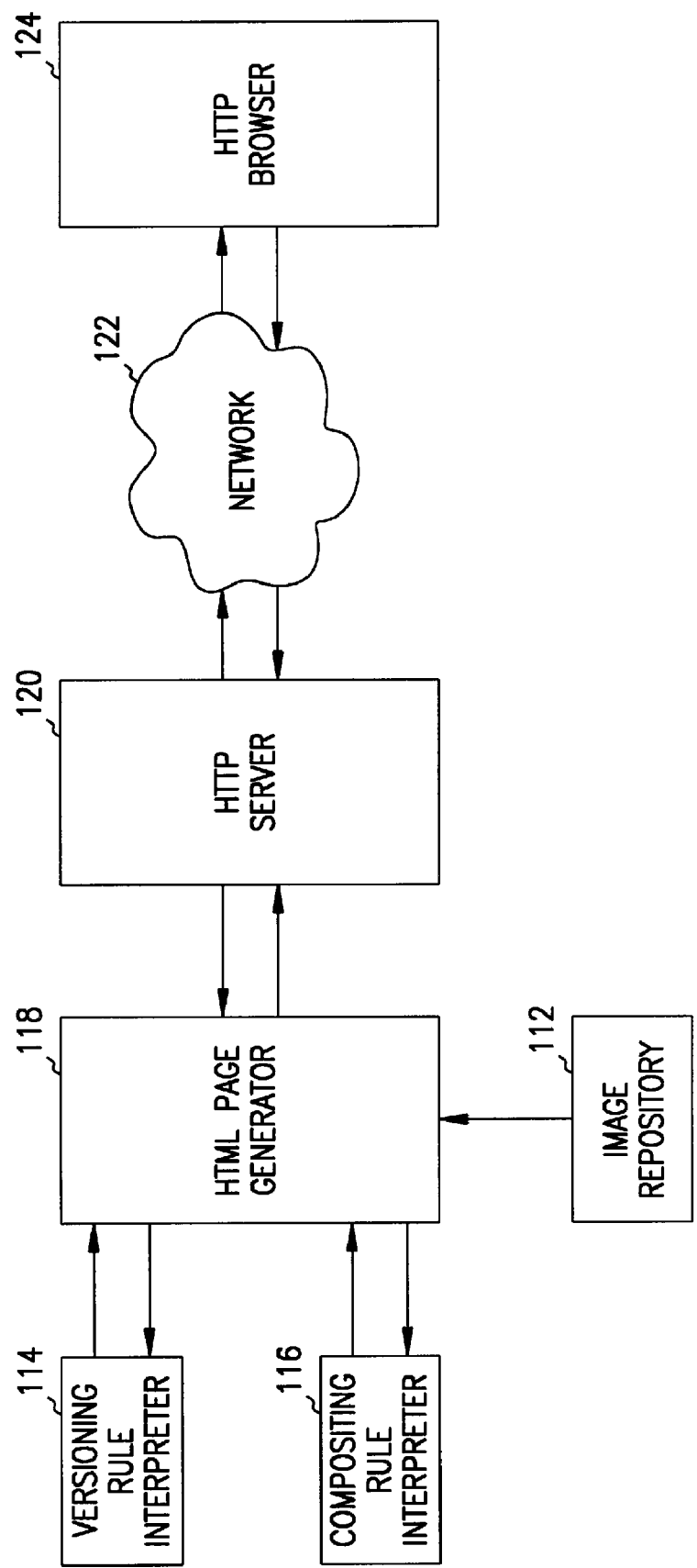
FIG. 11 is a block diagram of an implementation of a system for displaying selected images of garments worn by a mannequin over a network.

Another aspect of the preferred exemplary embodiment described above is a display system for retrieving images from the image repository and combining the images into a composite image for displaying to a user. One possible implementation of such a display system is as a client and server communicating over a network, in which the client part of the system (i.e., the user interface) is a hypertext transport protocol (http) or web browser that receives and displays the composite images of the clothed mannequins that the user requests. FIG. 11 is a block diagram showing the software components of such an implementation. The server side of the system includes an http server 120 and a page generator 118 for generating the html (hypertext markup language) pages containing the composite images in accordance with the user request. Upon receiving a request from the user to display a particular mannequin wearing particular garments from a particular viewing perspective, the html page generator 118 (which may be, e.g., a common gateway interface script or a program communicating with the http server via an application server layer) communicates with a versioning rule interpreter 114 in order to select the particular images retrieved from the image repository 112. Next, the retrieved images are layered into a composite image that is embedded into an html page, with the layering dictated by a compositing rule interpreter 116 with which the page generator 118 also communicates. The html page containing the desired image is then transmitted by the http server 120 over a network to the http browser 124 that is the user interface in this implementation. Such an implementation would be particularly suitable for use in an online internet catalogue, for example, in which the garment images are used to inform purchaser decisions. In this embodiment, the user may establish a virtual identity by selecting a particular mannequin, naming the mannequin, and establishing other parameters that govern how the mannequin interacts with the dressing environment as well as possibly other virtual environments. Such information could, for example, be stored in the form of a cookie on the user's machine which is transmitted to the http server upon connection with the user's browser.

Other implementations of the system shown in could be used by professional animators to generate images of clothed characters or by garment designers to generate images of garments as they are designed for actual manufacture. In those cases, the system could be implemented either over a network or as a stand-alone machine. Such users may be expected to use the system for populating the image repository with garment images shown in FIG. 10 to generate images corresponding to their own garment designs. An appropriate implementation of the display system shown in FIG. 11 (e.g., non-networked) can then be used to render images of mannequins wearing selected garments that can be used in animated features or as an aid to the garment design process.

In another embodiment, rendering frames rather than images are stored in the repository and retrieved for display in response to user requests. Select objects such as garments are extracted from particular frames of simulation scenes containing select garments and mannequins to generate rendering frames that are stored in the repository. When a user selects a display of a particular mannequin and garment combination, the system, retrieves the appropriate rendering frames according to versioning rules and renders a composite image from a selected viewpoint. The particular viewpoint presented to the user at any one time is a static image, but it may be updated rapidly enough to give the impression of a continuously changing viewpoint. The images are rendered from the frames either simultaneously using the depth information contained therein, or separately from each frame with the separately rendered images then being displayed in layered order dictated by compositing rules. The functions of the system could be implemented on a stand-alone machine or distributed over a network, e.g., as where rendering frames are downloaded to a java applet executed by a web browser that renders the images displayed to the user.

In certain situations, available hardware performance may be such as to make it desirable to simulate draping and collision of select garments and mannequins according to user requests in real time. In such an embodiment, rendering frames are generated from the user-selected three-dimensional simulation scenes, and images for displaying to the user are then rendered. The simulation scene in this embodiment may be changed in accordance with user preferences, for example, animating the mannequin within the simulation to move from a dressing pose to a user-selected target pose before generating a rendering frame. Shape blending between previously generated rendering frames can be used to improve performance in generating rendering frames with modified garment and/or mannequin parameters. In order to display the mannequin wearing multiple garments, the garments can simultaneously simulated in a single scene, or separate simulations can be performed for each garment with the rendering frames generated therefrom being combined in accordance with versioning rules.

Although the invention has been described in conjunction with the foregoing specific embodiments, many alternatives, variations, and modifications will be apparent to those of ordinary skill in the art. Such alternatives, variations, and modifications are intended to fall within the scope of the following appended claims.

What is claimed is:

1. A method for producing an image of a computer-simulated mannequin wearing a garment as defined by selected mannequin and garment parameter values, comprising:
   generating objects corresponding to a representative mannequin and a garment placed in a simulation scene within a three-dimensional modeling environment;
   simulating draping and collision of the garment with the representative mannequin within the simulation scene to generate a three-dimensional rendering frame of the representative mannequin wearing the garment;

constraining portions of the garment to reside within or outside of one or more shells defined around the representative mannequin in the rendering frame during the draping and collision simulation, wherein each shell is a three-dimensional construct designed to mimic the physical interaction of the garment with another garment; and, rendering a two-dimensional image of the garment from the rendering frame and layering the rendered garment image upon a two-dimensional image of a selected mannequin.

2. The method of claim 1 wherein the rendered image is used to form a visual image on a computer display device.

3. The method of claim 1 further comprising generating rendering frames containing mannequin or garment objects as defined by selected parameter values by shape blending corresponding objects of previously generated rendering frames.

4. The method of claim 1 wherein the garment object comprises a plurality of garment panels that are connected together during the draping and collision simulation and further wherein the garment parameters include panel dimensions.

5. The method of claim 1 wherein two-dimensional images are rendered from a rendering frame using a plurality of camera positions.

6. The method of claim 1 further comprising storing the rendered garment image in a repository for containing a plurality of two-dimensional garment images.

7. The method of claim 1 further comprising generating multiple rendering frames for a plurality of different garments and layering a plurality of two-dimensional images of the different garments upon the selected mannequin.

8. The method of claim 7 wherein specific versions of the different garments are defined that reside within or outside of one or more shells during the draping and collision simulations that generate the multiple rendering frames and further wherein the versions of the different garments are selected in accordance with versioning rules that define which versions of a particular garment are permitted when combined with another particular garment.

9. The method of claim 7 wherein separate rendering frames are generated for each of the different garments.

10. The method of claim 9 wherein the separate rendering frames are combined into a composite two-dimensional image using Z-coordinates of the objects.

11. The method of claim 9 wherein the garments contained in the separate rendering frames are rendered into separate two-dimensional garment images that are layered upon a two dimensional rendering of the mannequin to create a composite two-dimensional image.

12. The method of claim 11 further comprising layering the separate two-dimensional images on a two-dimensional image of the mannequin in accordance with a compositing rule that defines in what order specific garment images should be layered to thereby generate a composite two-dimensional image of the mannequin wearing the garments.

13. The method of claim 1 further comprising mapping texture objects to the garment objects in rendering frames wherein the texture objects are selected from a group consisting of colors, fabric patterns, buttons, collars, and ornaments.

14. The method of claim 1 wherein an image rendered from the rendering frame is transmitted over a network to a display device.

15. A processor-readable storage medium having processor-executable instructions for performing the method recited in claim 1.

16. A method for producing an image of a computer-simulated mannequin wearing a garment as defined by selected mannequin and garment parameter values comprising:

generating objects corresponding to a first mannequin and a first garment placed in a simulation scene within a three-dimensional modeling environment;

simulating draping and collision of the first garment with the first mannequin within the simulation scene to generate a first three-dimensional rendering frame of the first mannequin wearing the first garment;

generating a second rendering frame containing a second mannequin and a second garment as defined by selected parameter values that specify different dimensions from the first mannequin and/or first garment by shape blending corresponding objects of the first rendering frame, wherein the shape blending is performed by linearly combining parameters of the first rendering frame and performing a partial draping and collision simulation;

rendering an image from the second rendering frame; and constraining portions of the garment to reside within or outside of one or more shells defined around the mannequin in each rendering frame during the draping and collision simulation, wherein each shell is a three-dimensional construct designed to mimic the physical interaction of the garment with another garment.

17. A method for generating an image of a computer-simulated garment suitable for combining into a composite image of a selected computer-simulated mannequin wearing selected garments, comprising:

generating objects corresponding to a mannequin and a garment placed in a simulation scene within a three-dimensional modeling environment;

simulating draping and collision of the garment with the mannequin in the simulation scene to generate a three-dimensional rendering frame containing the mannequin wearing the garment;

constraining portions of the garment to reside within or outside of one or more shells defined around the mannequin in the rendering frame during the draping and collision simulation, wherein each shell is a three-dimensional construct designed to mimic the physical interaction of the garment with another garment; and, rendering a two-dimensional garment image from the rendering frame.

18. The method of claim 17 further comprising rendering images of a plurality of versions of particular garments that are combinable into composite images in accordance with versioning rules, wherein a version of a garment is generated by constraining portions of the garment object within a rendering frame to reside within or outside of a particular shell defined around the mannequin.

19. The method of claim 18 further comprising generating rendering frames containing mannequin or garment objects as defined by selected parameter values by shape blending corresponding objects of one or more previously generated rendering frames.

20. The method of claim 18 wherein a garment in the rendering frame is modified in accordance with a selected garment parameter value by modifying the parameter in the rendering frame and performing a partial further simulation to simulate motion and collision of the modified garment with the mannequin.

21. The method of claim 20 wherein the garment model comprises a plurality of garment panels that are connected together during the draping and collision simulation and wherein the garment parameters include panel dimension parameters.

22. The method of claim 18 further comprising storing in a garment image repository garment images corresponding to a plurality of garment parameter values and created for a population of mannequins defined by a plurality of parameter values.

23. The method of claim 18 wherein the versions of particular garments that are rendered into garment images include versions differing by a fitting characteristic.

24. The method of claim 18 wherein the versions of particular garments that are rendered into garment images include versions differing by a wearing style.

25. The method of claim 17 further comprising mapping texture objects to the garment object in a rendering frame before rendering the garment into a two-dimensional garment image.

26. The method of claim 17 further comprising rendering from a rendering frame a plurality of garment images corresponding to a plurality of camera positions.

27. A system for generating images of a computer-simulated mannequin wearing a garment as defined by selected mannequin and garment parameter values, comprising:
   a user interface by which a user selects a mannequin and one or more garments to be worn by the mannequin, wherein the mannequin and garments selected may be further defined by specific mannequin and garment parameter values;
   a three-dimensional modeling environment for generating objects corresponding to a representative mannequin and a garment placed in a simulation scene and for simulating draping and collision of the garment with the mannequin within the simulation scene to generate a three-dimensional rendering frame of the mannequin wearing the garment; means for constraining portions of the garment to reside within or outside of one or more shells defined around the representative mannequin in the rendering frame
during the draping and collision simulation, wherein each shell is a three-dimensional construct designed to mimic the physical interaction of the garment with another garment; and,
   means for rendering a two-dimensional image of the garment from the rendering frame and layering the rendered garment image upon a two-dimensional image of the selected mannequin.

28. The system of claim 27 further comprising means for layering a plurality of two-dimensional garment images upon the two-dimensional image of the selected mannequin, wherein each garment image is rendered from a rendering frame generated by constraining portions of a selected garment to reside within or outside of one or more shells defined around a representative mannequin in the rendering frame during the draping and collision simulation, and wherein each shell is a three-dimensional construct designed to mimic the physical interaction of the selected garment with another garment.

29. The system of claim 28 wherein the plurality of two-dimensional garment images for layering upon the selected mannequin image are selected in accordance with versioning rules that define which versions of a particular garment are permitted when combined with another particular garment.

30. A system for generating images of a computer-simulated mannequin wearing a garment as defined by selected mannequin and garment parameter values comprising:
   a user interface by which a user selects a mannequin and one or more garments to be worn by the mannequin, wherein the mannequin and garments selected may be further defined by specific mannequin and garment parameter values;
   a three-dimensional modeling environment for generating objects corresponding to a representative mannequin and a representative garment placed in a simulation scene and for simulating draping and collision of the representative garment with the representative mannequin within the simulation scene to generate a first three-dimensional rendering frame of the mannequin wearing the garment;
   means for generating a second rendering frame containing the selected mannequin and the selected garment as defined by selected parameter values that specify different dimensions from the representative mannequin and/or representative garment by shape blending corresponding objects of the first rendering frame, wherein the shape blending is performed by linearly combining parameters of the first rendering frame and performing a partial draping and collision simulation;
   means for rendering an image from the second rendering frame; and
   means for constraining portions of the garment to reside within or outside of one or more shells defined around the mannequin in each rendering frame during the draping and collision simulation, wherein each shell is a three-dimensional construct designed to mimic the physical interaction of the garment with another garment.

31. A system for displaying a selected computer-simulated mannequin wearing a selected garment, comprising:
   a user interface by which a user selects a mannequin and one or more garments to be worn by the mannequin, wherein the mannequin and garments selected may be further defined by specific mannequin and garment parameter values;
   a repository containing a plurality of two-dimensional garment images and mannequin images as defined by specific parameters;
   wherein each two-dimensional garment image in the repository is generated by:
   generating objects corresponding to a representative mannequin and a garment placed in a simulation scene within a three-dimensional modeling environment,
   simulating draping and collision of the garment with the representative mannequin within the simulation scene to generate a three-dimensional rendering frame of the representative mannequin wearing the garment,
   constraining portions of the garment to reside within or outside of one or more shells defined around the representative mannequin in the rendering frame during the draping and collision simulation, wherein each shell is a three-dimensional construct designed to mimic the physical interaction of the garment with another garment, and
   rendering a two-dimensional image of the garment from the rendering frame; and,
   a compositing rule interpreter for displaying the two-dimensional images of user-selected garments and of a selected mannequin in a layered order dictated by compositing rules.

32. The system of claim 31 wherein the garment images contained in the repository include images of different versions of garments, wherein different versions of a particular garment are combinable with specific other garments.

33. The system of claim 32 further comprising a versioning rule interpreter for choosing among versions of the garment images for displaying in accordance with versioning rules that define which versions of particular garments are permitted when combined with another particular garment.

34. The system of claim 32 wherein the compositing rule interpreter displays two-dimensional images of versions of user-selected garments chosen by the versioning rule interpreter and of a selected mannequin in a layered order dictated by the compositing rules.

35. The system of claim 31 wherein the repository includes garment images rendered from rendering frames generated by shape blending corresponding objects of previously generated rendering frames.

36. The system of claim 31 wherein the mannequin parameters include a parameter corresponding to a body measurement.

37. The system of claim 31 wherein the mannequin parameters include a parameter designating selection of a particular mannequin from a population of mannequins.

38. The system of claim 31 wherein the garment parameters are selected from a group consisting of dimension, color, and style.

39. The system of claim 31 wherein the plurality of two-dimensional garment and mannequin images are rendered from a plurality of selectable camera angles.

40. The system of claim 31 wherein the user interface permits selection of versions of particular garments that are rendered into garment images that exhibit a particular wearing style.

41. A system for displaying a selected computer-simulated mannequin wearing a selected garment, comprising:
   a user interface by which a user selects a mannequin and one or more garments to be worn by the mannequin, wherein the mannequin and garments selected may be further defined by specific mannequin and garment parameter values;
   a repository containing a plurality of two-dimensional garment images and mannequin images as defined by specific parameters;
   wherein each two-dimensional garment image in the repository is generated by:
   generating objects corresponding to a representative mannequin and a garment placed in a simulation scene within a three-dimensional modeling environment,
   simulating draping and collision of the garment with the representative mannequin within the simulation scene to generate a three-dimensional rendering frame of the representative mannequin wearing the garment,
   constraining portions of the garment to reside within or outside of one or more shells defined around the representative mannequin in the rendering frame during the draping and collision simulation, wherein each shell is a three-dimensional construct designed to mimic the physical interaction of the garment with another garment, and
   rendering a two-dimensional image of the garment from the rendering frame; and,
   means for displaying the two-dimensional images of user-selected garments and of a selected mannequin in a layered order determined from depth information contained in the simulation scene.

42. The system of claim 41 wherein the plurality of two-dimensional garment and mannequin images are rendered from a plurality of selectable camera angles.

* * * * *